June 29, 1954  L. N. ROBERSON  2,682,590
THERMOSTATIC SWITCH
Filed April 28, 1952

INVENTOR.
Leonard N. Roberson
BY
Fred C. Matheny
ATTORNEY

Patented June 29, 1954

2,682,590

UNITED STATES PATENT OFFICE 2,682,590

THERMOSTATIC SWITCH

Leonard N. Roberson, Seattle, Wash.

Application April 28, 1952, Serial No. 284,798

9 Claims. (Cl. 200—140)

This invention relates to a thermostatic switch and an object of this invention is to provide a thermostatic switch which is simple in construction, not expensive to manufacture, reliable in operation, neat in appearance, and easy to assemble and adjust.

Another object is to provide a thermostatic wall switch which is highly sensitive to changes in the temperature of the surrounding air and which is further highly sensitive to radiant heat emanating from a source above or below said thermostat.

Another object of this invention is to provide thermostatic switch means in which provision is made for over expansion of a heat responsive member of the thermostat without danger that such over expansion will damage the switch means or any other parts of the mechanism or disturb the adjustment of the same.

Another object is to provide a unitary thermostatic switch means in which a single thermostat is used to operate a two pole switch or two adjacent switches for the control by one thermostat of two different electric circuits and in which there may be provided an interval between the actuation of the two poles or switches.

In instances where radiant heating means is installed in the ceiling or floor or both it is desirable that the thermostat which controls such radiant heating means shall be at least partially responsive to the direct incidence on the heat responsive member of the thermostat of radiant heat from the heating means. I accomplish this by providing a thermostat constructed so that some heat may pass directly from the radiant heat source to the heat responsive member of the thermostat.

Other objects of this invention will be apparent from the following description taken in connection with the accompanying drawings.

In the drawings:

Figure 1 is a view in front elevation of a thermostatic switch constructed in accordance with this invention, the swith means being of the two pole double throw type.

Fig. 2 is a view partly in cross section and partly in plan taken substantially on broken line 2—2 of Fig. 1.

Fig. 3 is a view partly in longitudinal section and partly in elevation taken substantially on broken line 3—3 of Fig. 1.

Fig. 4 is a detached isometric view showing the inside of a cover plate or housing member used on this thermostat.

Fig. 5 is a detached isometric view showing the front or outer side of a wall plate upon which other parts of this thermostatic switch means are mounted.

Fig. 6 is a cross sectional view of said wall plate taken substantially on broken line 6—6 of Fig. 5.

Fig. 7 is a detached isometric view of a switch mounting bracket which is permanently secured to the back of the wall plate.

Fig. 8 is an exploded sectional view showing means for adjustably mounting a graduated dial in a thermostat assembly.

Fig. 9 is a view partly in plan and partly in cross section similar to Fig. 2 showing a one pole double throw thermostatic switch.

Like reference numerals designate like parts throughout the several views.

This device comprises thermostatically controlled switch means, which may embody more than one switch, such as the form illustrated in Figs. 1 to 8 inclusive, or which may embody only one double throw electric switch, such as the form of invention illustrated in Fig. 9.

The thermostat means and cover member therefor are identical in all of the figures but the wall plate and some of the parts attached thereto are different in the form of invention shown in Figs. 1 to 8 and Fig. 9.

The form of invention shown in Figs. 1 to 8 comprises a wall plate 15 adapted to be attached to a wall as by screws 16, one of which is shown in Figs. 1 and 2. The screws 16 pass through holes 17 in the wall plate 15. The rear side of the wall plate 15 has a switch mounting bracket 18 rigidly secured thereto. This bracket 18 preferably has two base members 19 bent at right angles thereto adjacent its respective ends and these base members 19 are preferably welded to the wall plate 15. The switch mounting bracket 18 is on the back of the plate 15 and is perpendicular thereto and extends lengthwise of said wall plate 15 medially between the two sides thereof. The bracket 18 is provided with a transverse hole 20 and with a slot 21 through which bolts 22 may be passed to secure two switches 23 and 24 to said mounting bracket. The switches 23 and 24 are positioned on opposite sides of the bracket 18 and each switch has a thin plate 14 of insulating material secured to each side thereof and preferably extending rearwardly beyond the switch. The switches 23 and 24 are of conventional construction and are not herein shown in detail. Each switch 23 and 24 is provided with a switch operating plunger 25 which is positioned in registration with an opening 26, Fig. 6, in the wall plate 15. The slot 21 in the mounting bracket 18 makes possible an adjustment of the switches 23 and 24 so that these switches will be operated at different times and at different temperatures, as hereinafter more fully explained.

The thermostat devices are positioned at the front or outer side of the wall plate 15 and may be secured to and carried by a combined cover and housing member designated generally by 27. This housing member 27 is of one piece construction and is open at both the top and bottom ends to provide a free circulation of air therethrough and to permit the entrance of radiant heat, as hereinafter explained. This housing member 27 has a flat front wall which functions as a thermostat supporting plate and has side walls 29 provided with step portions 30. The inner edge portions of the side walls 29 are inwardly bent to provide flanges 31. The step portions 30 provide offsets in the side walls 29 which strengthen and improve the appearance of the one piece housing.

The housing member 27 is constructed of resilient material, such as sheet metal which will yield or spring outwardly in the event it is subjected to excess pressure from the inside. The inwardly bent flanges 31 are adapted to be engaged beneath two longitudinally extending offset centering brackets of flat metal. Each centering bracket has a part 32 which lies against and is welded or otherwise rigidly secured to the outer side of the wall plate 15 and has another part 32' which is offset and spaced outwardly from the wall plate 15 far enough to receive thereunder a flange 31 of the housing member 27. The brackets 32, 32' are positioned adjacent the respective edges of the wall plate 15.

The housing member 27 is correctly positioned lengthwise of the wall plate 15 and is prevented from moving lengthwise of said wall plate 15 when in engagement therewith by providing in at least one of the flanges 31 of the housing 27 at least one notch 33 which is adapted to fit over a knob 34 of the wall plate. Preferably one notch 33 is provided in each flange 31 and a knob 34 is provided for each notch 33 to fit over. The knobs 34 are preferably formed by punching the wall plate 15 toward the bracket parts 32'.

The resiliency of the housing member 27 allows it to be applied to the wall plate 15 by inserting one of the flanges 31 under one of the bracket parts 32' and springing the opposite side of the housing member 27 outwardly, see dotted lines Fig. 2, and engaging the other flange 31 under the other bracket part 32'. Similarly the housing member 27 is disengaged from the wall plate 15 by first springing one side thereof outwardly to disengage one flange 31 and then disengaging the opposite flange 31.

An internally threaded tubular socket 35 is welded or otherwise rigidly secured to the inner side of the outer wall 28 of the housing 27. The socket 35 is adapted to receive and adjustably support a thermostat member 36 with graduated dial 37. The thermostat member herein illustrated is of the cylindrical bellows or wafer or Sylphon type and is provided on its outer side with a rigidly attached axial tubular internally threaded hub 38. The dial 37 is made of a material, such as transparent plastic, which will permit a large percentage of radiant heat incident thereon to pass through said dial and fall upon the temperature responsive member 36. Said member 36 is preferably black on the exterior so that heat reflection is minimized and a large percentage of the radiant heat incident thereon is absorbed thereby.

A washer 40 fits over the hub 38 and the graduated dial 37 has a central opening 41 which fits over the periphery of the washer 40. The washer 40 is of slightly greater thickness than the graduated dial 37. A resilient metal disc 42 has a central opening 43 which fits over the hub 38 so that the disc 42 can be clamped against the washer 40. The peripheral portion of the disc 42, outwardly from the periphery of the washer 40, is punched at a plurality of points to provide knobs 44 which press against and frictionally engage with the graduated dial 37. An externally threaded tubular sleeve 45 fits over the hub 38 outwardly from the disc 42 and a screw 46 is inserted from the outer end of the tubular sleeve 45 and threaded into the hub 38. When the screw 46 is tightened it clamps the parts 36, 38, 40, 42 and 45 securely together so that they operate as a single unit. However, the graduated dial 37 is not positively and immovably clamped between the disc 42 and thermostat 36 but is frictionally held between these two parts by engagement of the knobs 44 with said dial. This frictionally holds the dial 37 so that it will normally move rotatively with the other parts of the thermostat assembly but may be rotatively adjusted manually relative to said other parts to set the dial or calibrate the instrument so that it will read correctly. This adjustment may be made without removing the thermostat from the wall and without disassembly of the thermostat by first rotating the dial 37 to a point where the thermostat just clicks "off," then marking the bellows 36, as with a pencil, in line with the slot of the screw 16, see Fig. 1, then manually holding the bellows 36 firmly and manually rotatively moving the dial 37 relative to the other parts of the thermostat assembly until the graduation on the dial which indicates the actual room temperature, as measured with an accurate thermometer placed near the thermostat, registers with the pencil mark on the bellows.

It is preferable to frictionally secure the dial 37 to the remainder of the thermostat assembly as just hereinbefore described so as to provide for calibration of the instrument without disassembly. However it will be understood that if the dial 37 is securely and non-rotatively clamped to the other parts of this assembly the instrument will normally operate in the same manner as if the dial is frictionally secured and the instrument may be calibrated by removing the housing 27 from the wall plate 15 and loosening the screw 46 and making the proper adjustments and then tightening said screw.

The sleeve 45 is threaded into the socket 35 which is rigid with the housing member 27. Obviously turning of the unit formed by parts 36 to 46 inclusive will move these parts toward and away from the wall plate 15 and switches 23 and 24.

The socket 35 is attached to the housing wall 38 medially between the two sides and nearer to the top than to the bottom of said housing. This locates the dial 37 so that the upper portion of said dial will be visible above the top edge of the housing 27. This also allows manual access to the dial and the thermostat member 36 for the purpose of calibrating the instrument and for the purpose of setting the thermostat to respond to different temperatures. The housing 27 is open at both the top and bottom ends to permit free circulation of air therethrough and to permit radiant heat from floor or ceiling or both to enter through the open ends of the housing and pass through the dial 37 and fall upon the bellows 36.

The two switches 23 and 24 are operated by the thermostat assembly just hereinbefore described by providing on the outer side of the wall plate 15 and between the wall plate and the thermostat assembly a resilient switch operating plate 47. The plate 47 has a reversely bent or doubled under lower end portion 48 which is welded or otherwise rigidly secured to the wall plate 15. The upper end portion of the switch operating plate 47 is pressed or dented toward the wall plate 15 to form two spaced apart rounded knobs 50 and 51 for engagement with the plungers 25 of the respective switches 23 and 24. Also the upper end portion of said switch operating plate 47 is further reversely dented to provide a medial knob 52 for engagement with a centrally positioned protrusion 53 on the bellows member 36. The knob 52 is positioned mid-way between the knobs 50 and 51 so that pressure exerted by the bellows 36 is evenly balanced.

If over expansion of the bellows 36 should occur it will first operate the switches 23 and 24 and will then press the plate 47 against the wall plate 15. After this has occurred further expansion will be absorbed by the resiliency of the housing member 27 and wall plate 15 without danger of damage to the switches or other parts and without interfering with the adjustment of the instrument.

The switches 23 and 24 are of standard construction and the plungers 25 are spring loaded and each plunger is capable of exerting a pressure of several ounces against the resilient switch operating plate 47. The resilient plate 47 is constructed and arranged so that it reacts against these plungers with a pressure slightly less than the total pressure exerted by the two plungers. This neutralizes a major portion but not all of the spring load on the plungers and greatly increases the sensitivity of the instrument. This is important in the present instance where a single bellows 36 is called on to operate two switches at the same time. Obviously it is more important where the single bellows is called on to operate more than two switches at one and the same time. It has been found that there is a differential of from three to four degrees between the "off" and "on" positions of the switches when the bellows 36 is called on to overcome the entire spring load on the two plungers. When the major portion of this spring load is counterbalanced by the resiliency of the plate 47 the temperature differential between the "off" and "on" positions of the switches 23 and 24 is only about one to one and one half degrees. Reversely bending the lower end of the plate 47 makes it possible to secure a more uniform resilient pressure against the spring loaded plungers 25 throughout the full travel of these plungers.

Preferably an outwardly extending stop member 55 is provided on the peripheral portion of the thermostat dial 37 for engagement with a fixed lug or stop 54 to limit the rotary movement of the dial 37 to a little less than one complete revolution. The stop 54 may be formed by bending up a piece of one of the plates 32, 32', see Fig. 5.

The interfitting threads of the socket 35 and sleeve 45 are fairly coarse so that not more than one complete turn of the dial 37 is needed to provide sufficient adjustment of the thermostat assembly toward and away from the switches 23 and 24 for ordinary temperature settings.

The thermostat unit and housing shown in Fig. 9 are similar to those shown in Figs. 1 to 8 and hereinbefore described and like parts thereof are similarly numbered. A wall plate 15' shown in Fig. 9 is of modified form and has a switch mounting bracket 18' secured thereto in an off center position. A switch 23' is adjustably secured to the bracket 18' medially of the wall plate 15'. A plunger 25' of switch 23' extends through an opening 26' in the plate 15'. The protrusion 53 on the thermostat bellows 36 engages directly with the plunger 25'. The switch operating plate 42 is not shown in the Fig. 9 structure although obviously it may be used in a one pole or one switch thermostat of the type shown in Fig. 9. Over expansion of the bellows 36 in Fig. 9 is absorbed as previously described except that the bellows 36 will press directly against the wall plate 15'.

In both the construction as shown in Figs. 1 to 8 and the construction as shown in Fig. 9 the dial 37 extends above the top edge of the housing 27 enough to facilitate adjustment and reading of the same. The vertically positioned slot in the upper screw 16 which is used to attach the wall plate to a wall serves as a fixed reference mark to which the dial may be set. In setting the instrument for different temperatures the thermostat bellows assembly is selectively moved toward and away from the fixedly supported switch means by placing a finger on the circumference of the dial 37 and rotatively moving the same. The interfitting threaded members 35 and 45 provide this movement toward and away from the switch means when the thermostat assembly is rotatively moved. After the instrument has been properly calibrated by slipping the dial 37 to a correct position relative to the other parts of the thermostat assembly then the reading of the dial relative to the screw 16 will indicate the temperature at which one switch will be operated.

The switches 23 and 24 of Figs. 1 to 8 may be adjusted on their mounting bracket 19 so that they will both be operated at the same temperature or so that there will be a temperature interval of, for instance, one or more degrees between the operation of these two switches. Thus it is possible to control two different heating units or one heating unit and one cooling unit with the one bellows two pole double throw thermostat assembly shown in Figs. 1 to 8. Similarly one heating unit or one cooling unit may be controlled with the thermostat structure shown in Fig. 9. Control of the heating and cooling units may involve the control of electric heaters, pumps, valves, fans and the like.

The foregoing description and accompanying drawings clearly disclose what I now regard as a preferred embodiment of this invention but it will be understood that changes in the same may be made within the scope and spirit of the following claims.

I claim:

1. Thermostatic control means comprising a wall plate; an electric switch mounted on one side of said wall plate; a trough shaped housing open at its upper and lower ends and having an outer wall and having side walls which are detachably connected with the side of said wall plate opposite said switch; and a bellows type temperature responsive thermostat disposed between said wall plate and the outer wall of said housing with a portion of said thermostat in switch operating relation to said switch, said trough shaped housing shielding said thermostat while providing through the open ends thereof a free circulation of air around said thermostat.

2. Thermostatic control means comprising a wall plate; an electric switch mounted on one side of said wall plate; a trough shaped housing open at its upper and lower ends and having an outer wall and having side walls which are detachably connected with the side of said wall plate opposite said switch, said housing having its concave face toward said wall plate; a temperature responsive cylindrical thermostat rotatively mounted disposed between said wall plate and the outer wall of said housing and having a switch operating part which is movable by expansion and contraction of the thermostat toward and away from said switch; a graduated disc shaped dial of larger diameter than the thermostat attached to the thermostat for movement therewith and with a portion of the dial extending above the upper end of the housing into a readily observable and readily engageable position; a threaded member on said thermostat; and another threaded member on the outer wall of said housing receiving said first mentioned threaded member and cooperating therewith to adjust said thermostat toward and away from said switch in response to rotary movement of said dial and thermostat.

3. Thermostatic control means comprising a wall plate having at least one opening therein; electric switch means mounted on one side of said wall plate; a thermostat supporting plate resiliently supported by said wall plate in spaced relation from the wall plate and on the opposite side of the wall plate from the switch means; at least one switch operating plunger protruding from the switch means in alignment with an opening in the wall plate; a bellows type temperature responsive thermostat disposed between said wall plate and said thermostat supporting plate; one side of said thermostat being positioned close to said wall plate and in operative relation to said switch plunger, whereby switch operating movement of the switch plunger by the thermostat will be stopped by the wall plate at a predetermined location; a graduated dial attached to said thermostat; and means supporting said thermostat from said resiliently supported thermostat supporting plate, whereby normal expansion of said thermostat will operate said switch means and over expansion of said thermostat will be borne by said wall plate and compensated for by yielding movement of said resiliently supported thermostat supporting plate.

4. Thermostatic devices comprising a wall plate; a switch mounting plate secured to one side of said wall plate and protruding therefrom; two switches carried by said switch mounting plate and having switch operating plungers resiliently urged toward the wall plate, said wall plate having an opening in registration with each plunger; a resilient switch operating plate mounted on the opposite side of said wall plate from said switches and resiliently engaging said switch operating plungers with a counterbalancing resilient force less than the opposed resilient force of the plungers; a temperature responsive cylindrical bellows type thermostat positioned outwardly from said switch operating plate and engaging said switch operating plate; and a trough shaped housing secured to said wall plate and extending over and supporting said thermostat, whereby expansion of said thermostat will move said switch operating plate and operate said switches.

5. Thermostatic devices comprising a wall plate; a switch mounting plate secured to one side of said wall plate and protruding therefrom; at least two switches carried by said switch mounting plate and having switch operating plungers extending toward the wall plate, said wall plate having an opening in registration with each plunger; independently adjustable means securing each switch to said switch mounting plate, whereby the relative positions of the switch operating plungers may be adjusted to adjust the time sequence operation of the switches; a switch operating plate mounted on said wall plate on the opposite side from said switches and movable into engagement with said switch operating plungers to operate the switches; a temperature responsive cylindrical bellows type thermostat positioned outwardly from said switch operating plate and engaging said switch operating plate; and a trough shaped housing secured to said wall plate and extending over and supporting said thermostat, whereby expansion of said thermostat will move said switch operating plate and operate said switches.

6. Thermostatic control means comprising a wall plate; an electric switch mounted on one side of said wall plate; a bellows type temperature responsive thermostat positioned on the side of said wall plate opposite said switch and having an operating connection with said switch; a graduated dial of material capable of transmitting radiant heat attached to the outer part of said thermostat; and a trough shaped housing exending across said thermostat and said dial supporting the same, said housing having an outer wall and having side walls extending toward and secured to said wall plate and said housing being of short length and being open at the top and bottom ends, whereby radiant heat traveling at an angle to the horizontal may enter through the ends of said housing and pass through said dial onto said thermostat and whereby air may circulate freely through said housing.

7. Thermostatic control means comprising a wall plate; an electric switch mounted on one side of said wall plate; a thermostat supporting plate carried by said wall plate and positioned in spaced relation from the wall plate on the opposite side of the wall plate from the switch; a bellows temperature responsive thermostat disposed between said wall plate and said thermostat supporting plate in operative relation to said switch; a graduated dial attached to said thermostat; screw means rotatively connecting said thermostat with said supporting plate, whereby rotation of said dial and said thermostat will adjust said thermostat toward and away from said switch for operation of the switch at different predetermined temperatures; a stop member on said dial; and another stop member on said wall plate in the path of said first mentioned stop member, whereby rotary movement of said thermostat and dial is limited to substantially one complete revolution.

8. Thermostat control means comprising a wall plate; an electric switch mounted on one side of said wall plate; a trough shaped housing secured to said wall plate with its concave side toward the wall plate; a cylindrical bellows type thermostat disposed in and carried by said trough shaped housing; screw threaded means rotatively connecting said thermostat with the outer wall of said housing; a graduated dial; and friction means adjustably connecting said dial with said thermostat, whereby said dial and thermostat will normally rotatively move synchronously and whereby said dial may be rotatively adjusted relative to said thermostat for calibration purposes.

9. Thermostat devices comprising a wall plate; switch means mounted on one side of said wall plate, said switch means having spring loaded switch operating plunger means extending toward the wall plate and portions of the wall plate in alignment with the plunger means being removed; a resilient switch means operating plate mounted on the opposite side of said wall plate from said plunger means and engaging with said plunger means with a resilient pressure which counterbalances a major portion of the spring loading of the plunger means, whereby sensitivity of operation of the switch means is increased; and heat responsive thermostat means carried by said wall plate and positioned outwardly from said switch means operating plate and connected with said switch means operating plate for moving the same toward said switch means in response to temperature changes of said thermostat means.

References Cited in the file of this patent

UNITED STATES PATENTS

| Number | Name | Date |
|---|---|---|
| 2,493,190 | Fuchs | Jan. 3, 1950 |
| 2,586,992 | Rapuano | Feb. 26, 1952 |